United States Patent [19]

Salonia et al.

[11] Patent Number: 5,665,316

[45] Date of Patent: Sep. 9, 1997

[54] PORTABLE OXYGEN GENERATOR

[75] Inventors: Tino Salonia, Richmond Hill; Davor Grunwald, Willowdale, both of Canada

[73] Assignee: Geno₂X Corporation, Richmond Hill, Canada

[21] Appl. No.: 576,913

[22] Filed: Dec. 22, 1995

Related U.S. Application Data

[63] Continuation-in-part of Ser. No. 312,084, Sep. 27, 1994, abandoned.

[30] Foreign Application Priority Data

Aug. 31, 1994 [CA] Canada .................................. 2131266

[51] Int. Cl.⁶ .............................. C01B 13/02; B01J 8/00
[52] U.S. Cl. .......................... 422/113; 422/202; 422/211; 422/213; 422/222; 423/579
[58] Field of Search .......................... 422/110, 113, 422/122, 177, 202, 211, 213, 222, 198; 423/579

[56] References Cited

U.S. PATENT DOCUMENTS

| | | | |
|---|---|---|---|
| 3,882,223 | 5/1975 | Reinhardt | 423/579 |
| 3,887,696 | 6/1975 | Bernard et al. | 423/579 |
| 3,917,461 | 11/1975 | Kühl et al. | 428/529 |
| 4,308,235 | 12/1981 | Rinaldi | 423/579 |
| 4,315,732 | 2/1982 | Rowbottam et al. | 431/444 |
| 4,466,556 | 8/1984 | Söchting | 222/1 |
| 4,488,951 | 12/1984 | Nolan et al. | 204/129 |
| 4,601,884 | 7/1986 | Coekelberghs et al. | 422/43 |
| 4,792,435 | 12/1988 | Najima | 422/110 |
| 4,861,560 | 8/1989 | Nakajima | 422/110 |
| 4,963,327 | 10/1990 | Russell | 422/120 |
| 5,078,798 | 1/1992 | Nicolson et al. | 134/7 |
| 5,292,488 | 3/1994 | Cerola et al. | 422/292 |
| 5,332,483 | 7/1994 | Gordon | 204/265 |

FOREIGN PATENT DOCUMENTS

| | | |
|---|---|---|
| 3514151 | 10/1986 | Germany. |
| 52-042155 | 10/1977 | Japan. |
| 55-26445 | 2/1980 | Japan. |
| 55-042237 | 3/1980 | Japan. |
| 76-049843 | 11/1981 | Japan. |
| 58-190804 | 11/1983 | Japan. |
| 62-059503 | 3/1987 | Japan. |
| 05229804 | 9/1993 | Japan. |
| 05270804 | 10/1993 | Japan. |
| 9101434 | 3/1991 | Rep. of Korea. |
| 2056310 | 3/1981 | United Kingdom. |
| 2167054 | 5/1986 | United Kingdom. |

*Primary Examiner*—Nina Bhat
*Attorney, Agent, or Firm*—Nixon & Vanderhye

[57] ABSTRACT

A portable oxygen generating system using the principle of exothermic catalytic decomposition of an aqueous hydrogen peroxide comprising a feed tank having a mouth to receive liquid hydrogen peroxide, a cap to seal the mouth during operation and an outlet pipe, an on/off valve to control discharge from the feed tank, a regular valve to stop discharge from the feed tank when pressure in the system is equal to a predetermined pressure, a reactor containing a catalyst of lead strips in which hydrogen peroxide is decomposed, a cooling coil to cool and condense the reaction products, a separator tank to hold liquid water and gaseous oxygen, a return pipe to the feed tank to balance pressure in the system, a drain with a drain valve to discharge water, and a product line to supply oxygen for use by an operator of the system.

7 Claims, 15 Drawing Sheets

PORTABLE OXYGEN GENERATOR

This application is a continuation-in-part of application Ser. No. 08/312,084, filed Sep. 27, 1994, now abandoned.

BACKGROUND OF THE INVENTION

1. Field of the Invention

This invention relates to a portable oxygen generator and, in particular, a portable oxygen generator which produces gaseous oxygen by a process of decomposition of aqueous hydrogen peroxide using a catalyst of embossed metallic lead strips.

2. Description of the Prior Art

Oxygen gas is used in scientific, medical and industrial procedures and there is a need for a relatively light and portable generating system. The development of a portable system has been disclosed in U.S. Pat. No. 4,792,435, entitled OXYGEN GENERATING SYSTEM which issued Dec. 20, 1988 to Nakajima Dokosho Company Limited of Tokyo, Japan in respect of an invention made by Nakajima, Masahiko, of Tokyo, Japan. As described in the abstract of this patent, the invention disclosed is an oxygen generating system for continuously generating oxygen gas by the catalytic decomposition of an aqueous hydrogen peroxide that includes a catalyst having a platinum group catalyst component carried on a highly porous sintered ceramic support of a large pore size and a reaction chamber for accommodating the catalyst. The system further includes a control device for controlling the operation of the hydrogen peroxide supplying based on a detection signal from a pressure sensor for detecting the pressure of the generated oxygen gas. The oxygen generating system is compact and reduced in weight due to the catalytic decomposition of hydrogen peroxide at high concentration, which can be carried out effectively and safely under an increased temperature.

Other relevant prior art includes U.S. patents:

| | | |
|---|---|---|
| 3,887,696 | 6/1975 | Bernard et al. |
| 3,917,461 | 11/1975 | Kuhl et al. |
| 4,315,732 | 2/1982 | Rowbottam et al. |
| 4,466,556 | 8/1984 | Sochting |
| 4,488,951 | 12/1984 | Nolan et al. |
| 4,601,884 | 7/1986 | Coeckelsberghs et al. | and Japanese patents:

| | |
|---|---|
| 42155 | 10/1977 |
| 26445 | 7/1978 |
| 49843 | 11/1981 | and United Kingdom patent 2056310 dated Mar. 19, 1981.

Aqueous hydrogen peroxide produces a large mount of oxygen per unit volume and is known as a means to reduce the size and the weight of an oxygen generator as compared, for example, to a high pressure oxygen gas cylinder. Japanese Utility Model Publication No. 26445/1980 discloses an oxygen gas generating system adapted to catalytically decompose aqueous hydrogen peroxide by using a manganese compound as a catalyst. This has been pointed out by Nakajima that the decomposing reaction proceeds explosively if the concentration of hydrogen peroxide exceeds about 5 w/w %. However, higher concentrations are necessary to achieve practical utility in a portable supply of aqueous hydrogen peroxide.

A platinum type catalyst for decomposing aqueous hydrogen peroxide at a higher concentrations was disclosed in Japanese Patent Publication No. 42155/1977. However, Nakajima teaches that this catalyst is not satisfactory given the required reaction area and defoliation problems and that prior to his patent that no effective practical means were available. Thus, he teaches that the catalyst layer on the support tends to be deteriorated with the increase of the gas pressure inside the support and to be washed out by the aqueous hydrogen peroxide.

It is also known to have a system of controlling the flow rate of hydrogen peroxide by adjusting a valve for supplying aqueous hydrogen peroxide depending on the pressure of the generated oxygen gas by means of a mechanical link. (See Japanese Patent Publication No. 49843/1981). Nakajima discloses a pressure sensor for detecting the pressure of the Oxygen gas and a water level sensor for detecting the water level in the gas/water separator attached to the separator. The sensors disclosed are semiconductor sensors or mechanical diaphragm sensors. A control unit controls a pump depending on the signal from the pressure sensor.

SUMMARY OF THE INVENTION

The present invention provides an improved construction of a portable oxygen generator employing the principle of the decomposition of hydrogen peroxide in the presence of a catalyst in a reactor. The system comprises a feed tank having an intake mouth to receive liquid hydrogen peroxide prior to operation, a cap to seal the mouth during operation and an outlet pipe; an on\off valve to permit an operator to control discharge from the feed tank; a regulator valve to stop discharge from the feed tank when pressure in the system is equal to a predetermined pressure and to permit discharge when pressure in the system is less than said predetermined pressure; a reactor in which hydrogen peroxide is decomposed in the presence of a catalyst to oxygen and water, said reactor being in communication with said feed tank through said discharge pipe, said on\off valve and said regulator; a cooling coil in communication with said reactor to condense the water to a liquid and cool the oxygen from the reactor; a separator tank in communication with said cooling coil to receive an hold the liquid water and oxygen from the cooling coil and being in communication with the feed tank to balance pressure in the feed tank with the pressure in the separator tank; a drain leading from a bottom portion of said separator tank to discharge liquid water and having a drain valve to open or close said drain as may be desired from time to time; a product line leading from a portion of the separator tank above the anticipated level of liquid water to supply oxygen for use by an operator of the system.

The oxygen generating system preferably has a reactor pipe having a round cross section. The catalyst preferably comprises lead strips and each lead strip preferably has a rectangular cross section and a length approximately equal to the length of the reactor. The lead strips are laid longitudinally within the reactor and packed in juxtaposition across the cross section of the reactor to leave gaps between the lead strips for the flow of hydrogen peroxide and water and oxygen through the reactor.

DESCRIPTION OF FIGURES

In the figures which illustrate a preferred embodiment of this invention.

DESCRIPTION OF THE PREFERRED EMBODIMENT

Figure 1:
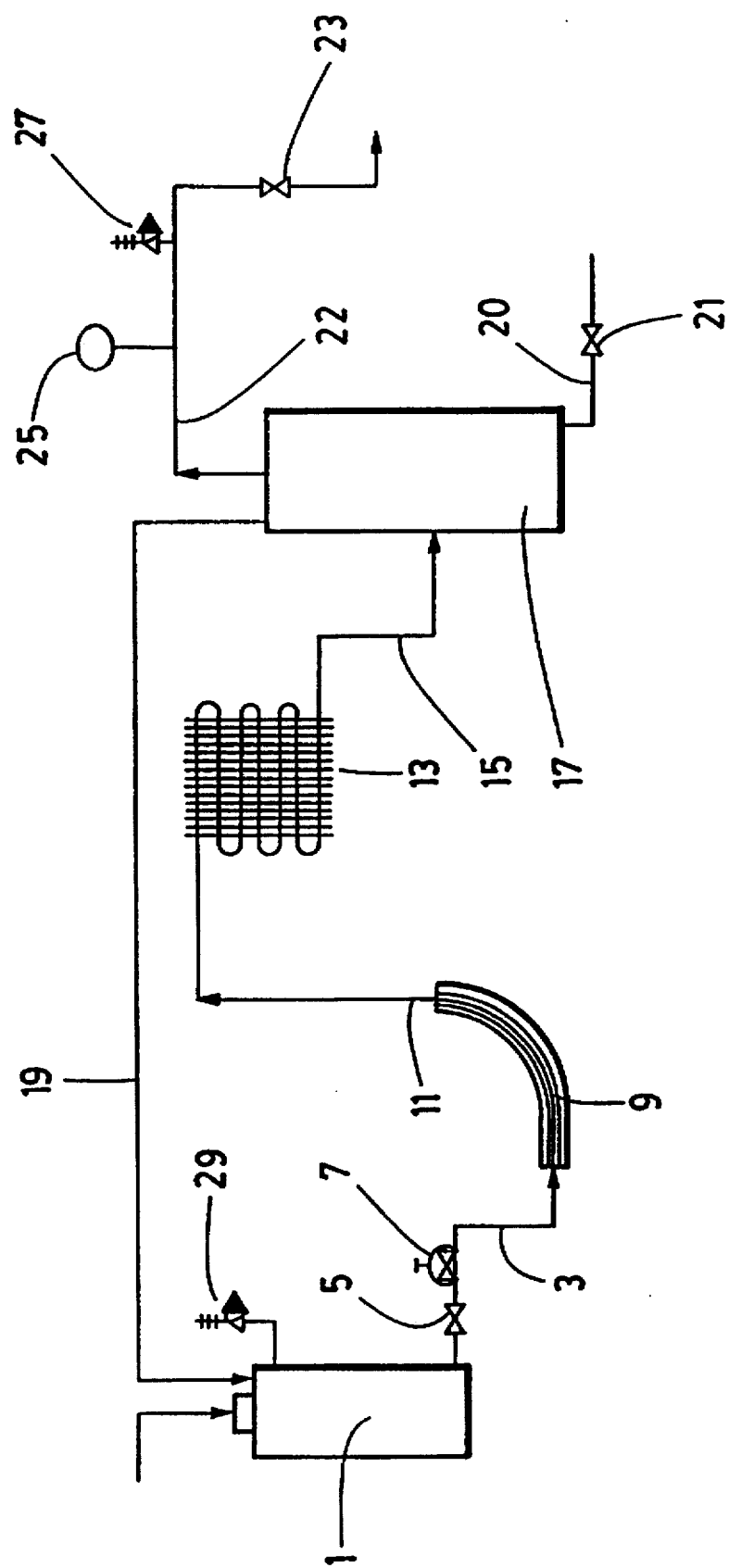
FIG. 1 is a process flow diagram of the oxygen generator of this invention.
Figure 2:
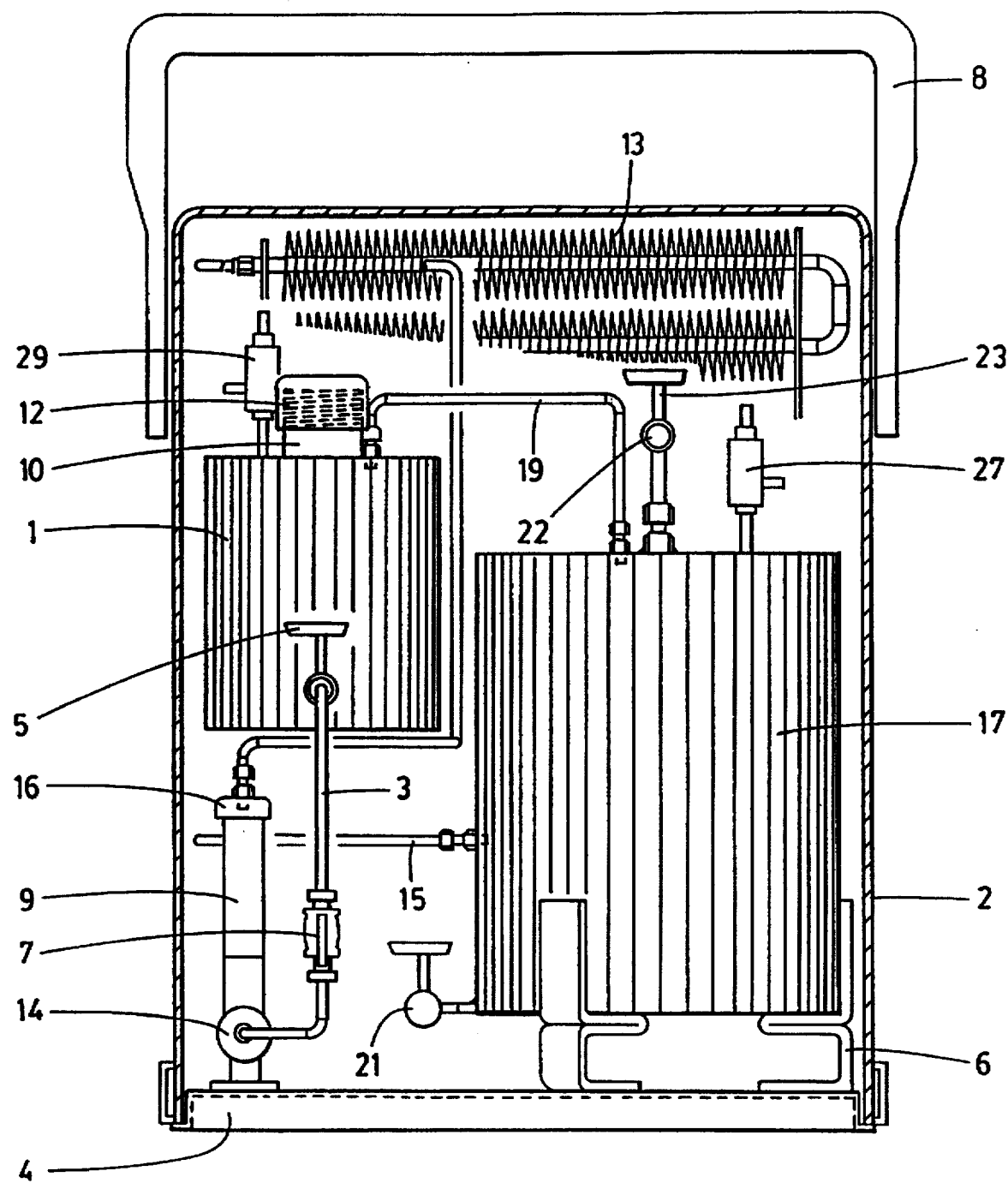
FIG. 2 illustrates a front sectional view of the oxygen generator.
Figure 3:
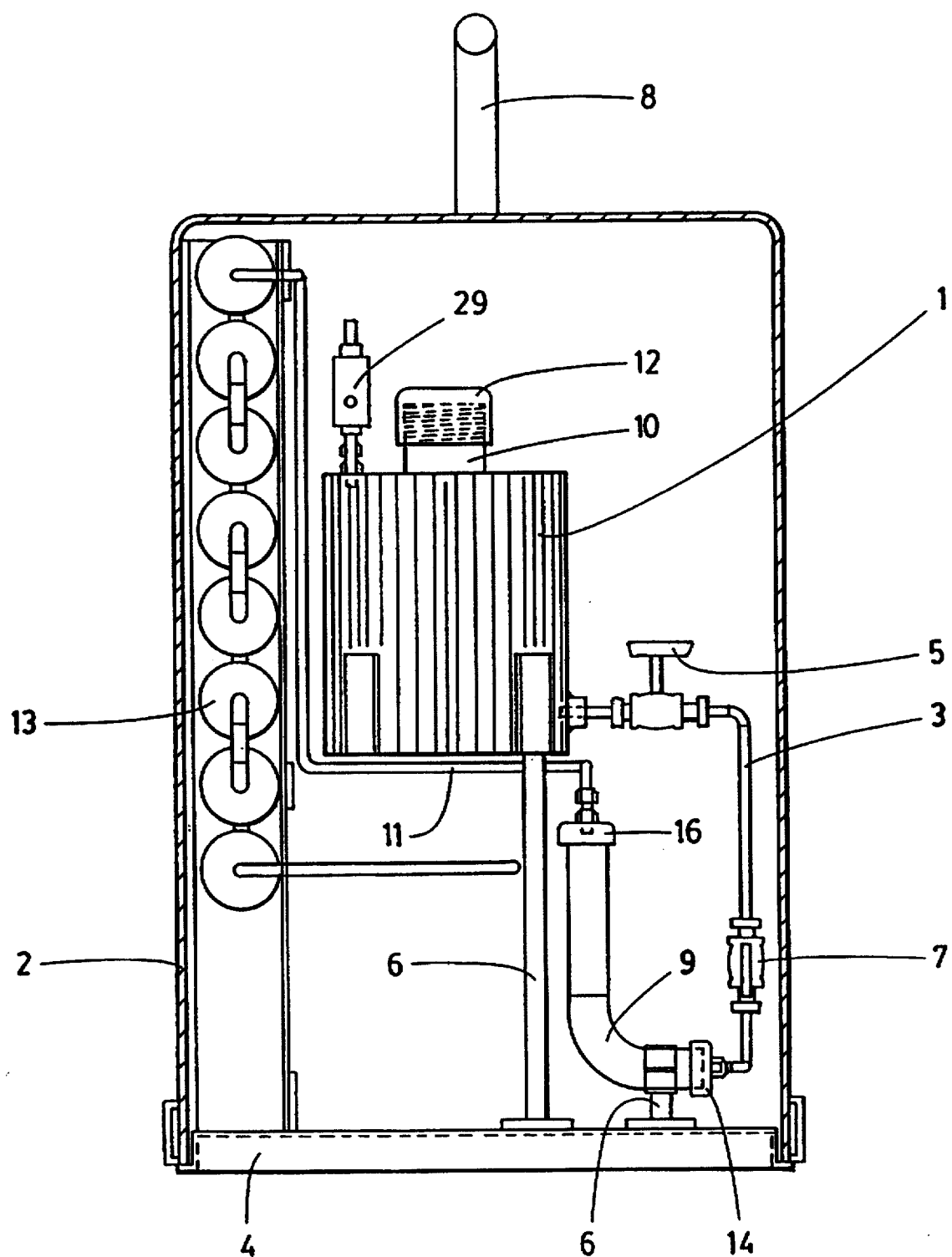
FIG. 3 illustrates a left side sectional view of the oxygen generator.
Figure 4:
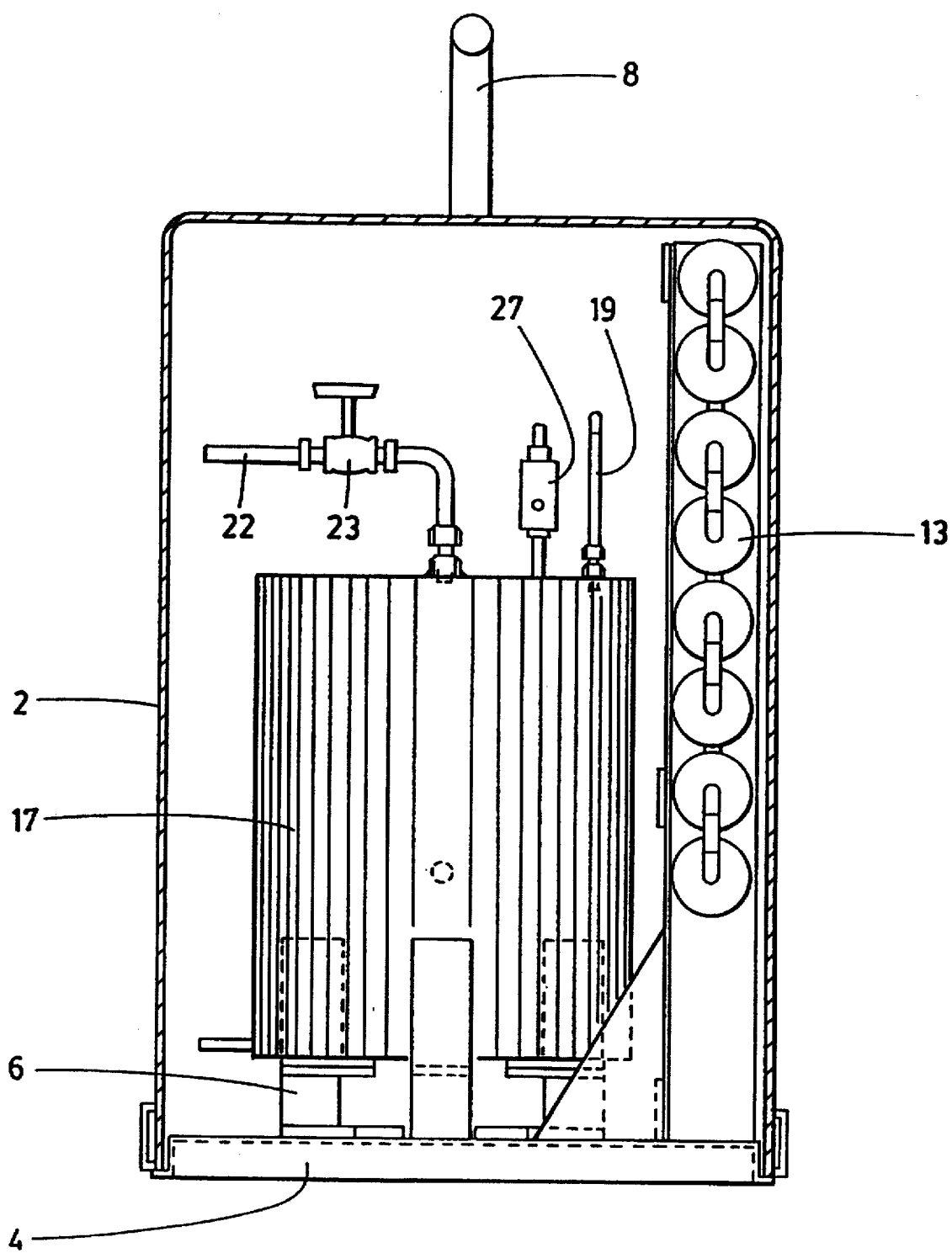
FIG. 4 illustrates a right side sectional view of the oxygen generator.
Figure 5:
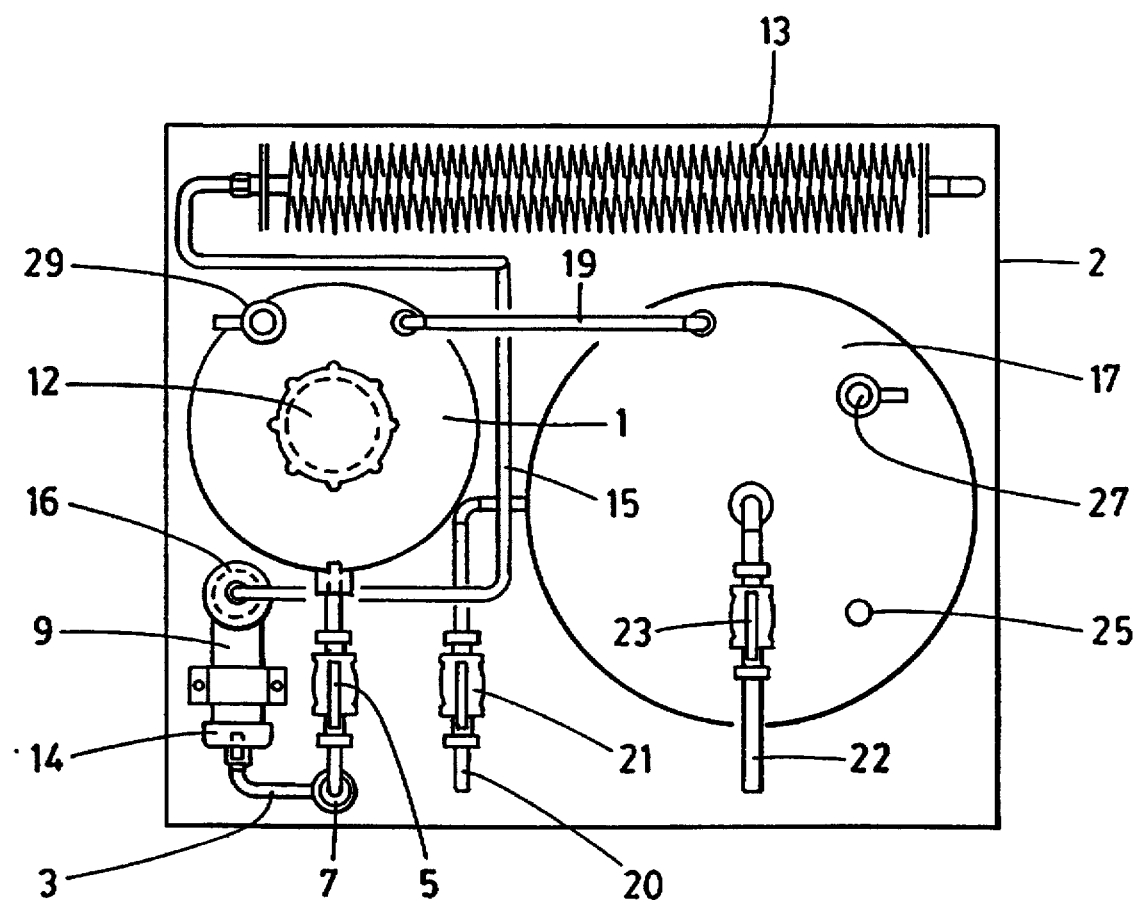
FIG. 5 illustrates a top sectional view of the oxygen generator.

The flow diagram of FIG. 1 may be referred to for understanding the general structure and operation of the invention. A feed tank (1) is filled with an aqueous hydrogen peroxide at a high concentration of about 35% by weight. The hydrogen peroxide is fed by gravity through a pipe (3), a feed valve (5) and a regulator (7) to a reactor (9). The decomposition of the peroxide occurs in the reactor (9) so that water vapour and oxygen pass out of the reactor (9) through pipe (11) to the cooling coils (13). The cooling coils (13) condense the water to a liquid and the oxygen and water pass through pipe (15) into a separator or expansion tank (17). The liquid water collects in the base of the tank (17) and the oxygen fills the atmosphere of the tank (17). A return pipe (19) permits the oxygen to recirculate to the feed tank (1) to pressurize the system. A draw off pipe (20) with an on\off valve (21) is provided to remove water from the system. A product pipe (22) with an on\off valve (23) is provided to draw off the oxygen for use. A pressure gauge (25) is provided on the product pipe (22) to measure the pressure of the oxygen being supplied to a user. Relief valves (27) and (29) are provided to protect against over pressuring of the system.

It will be understood by persons skilled in the art that all parts exposed to hydrogen peroxide will be constructed and passivated in a known manner to withstand pressures generated by the system and to avoid the corrosion.

The construction and layout of the portable unit of this invention is shown in FIGS. 2–5. The operating equipment is contained in a housing (2) erected over a base (4). The base (4) supports all the equipment by means of conventional support structures generally depicted as (6) which are not described further. A handle (8) is pivotally attached over the housing (2) to facilitate transportation of the unit.

Since the unit is intended to operate as a portable unit it is not designed to operate from a continuous supply of hydrogen peroxide although a person skilled in the art would be able to adapt the invention to a continuous supply. Consequently, the feed tank (1) has a wide mouth (10) so that liquid hydrogen peroxide may be poured into the tank (1) while the on\off valve (5) is closed. A screw cap (12) seals the mouth (10) of the feed tank (1) prior to operation. Further the product valve (23) and the drain valve (21) should be closed at the commencement of operation.

Once the on\off valve (5) is opened the peroxide is fed by gravity through pipe (3) and regulator (7) to the reactor (9) to decompose the peroxide to oxygen and water. As the water vapour and oxygen pass through the cooling coils (13), into the separator tank (17) and back along pipe (19) the pressure in the system begins to rise. The regulator valve (7) is preset to shut off the flow of hydrogen peroxide through pipe (3) to the reactor (9) at a predetermined operating pressure. Once flow is interrupted, the decomposition reaction stops and the system reaches equilibrium at the desired operating pressure.

Figure 6:
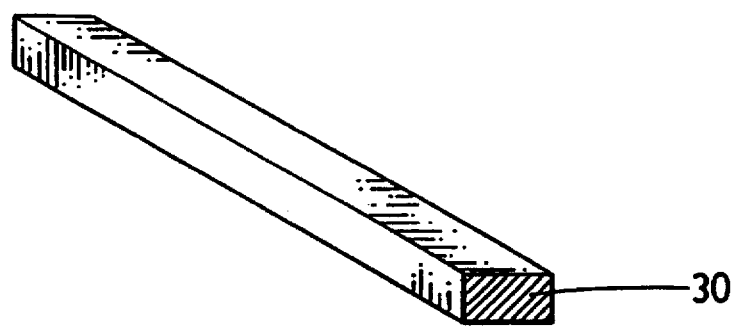
FIG. 6 illustrates a lead strip used in a reactor of this invention.
Figure 7:
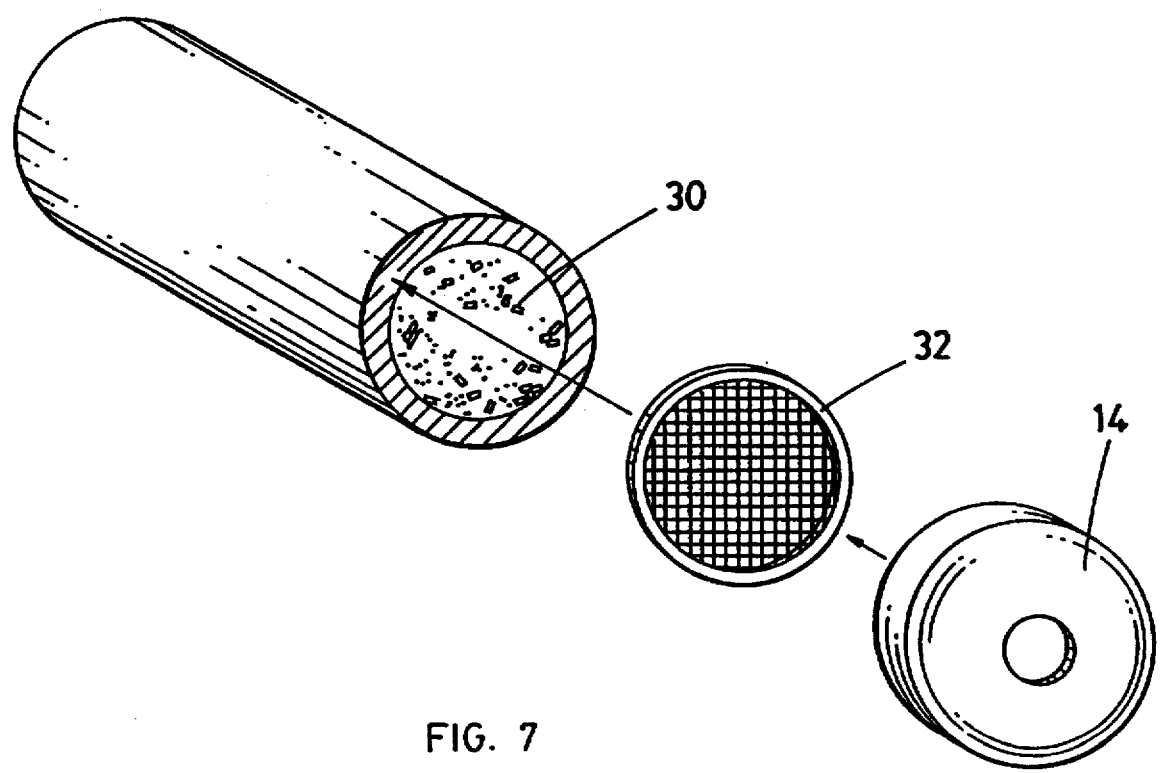
FIG. 7 illustrates a cross section of the reactor and the lead strips within the reactor.

The reactor (9) used in the preferred embodiment is a schedule 40 gauge pipe containing a catalyst of lead strips (30) (see FIG. 6 and 7). Each end of the reactor (9) has a screw cap (14 and 16) to permit the reactor to be opened and closed to replace the lead strips (30). Each cap seals a reactor end about its respective connecting pipe when the system is operational. A screen (32) is provided within each cap to prevent the lead strips from sliding out of the reactor. As illustrated in FIG. 6 the lead strips (30) are rectangular in cross section and about as long as the interior of the reactor (9). As shown in FIG. 7 the strips (30) are packed longitudinally within the reactor (9) to fill its interior cross section insofar as rectangular strips may fill a round pipe. The gaps between the strips (30) allow the peroxide to pass between them to effect decomposition in the presence of the lead catalyst. It may be determined when the strips are ready for replacement by monitoring the reaction time of the system, i.e. how long it takes to reach operating pressure at startup.

The description of the preferred embodiment of the portable system shown in FIGS. 8–20 will repeat some of the numbers used in the description of the embodiment shown in FIGS. 1 through 7 for convenient cross reference of parts.

Figure 8:
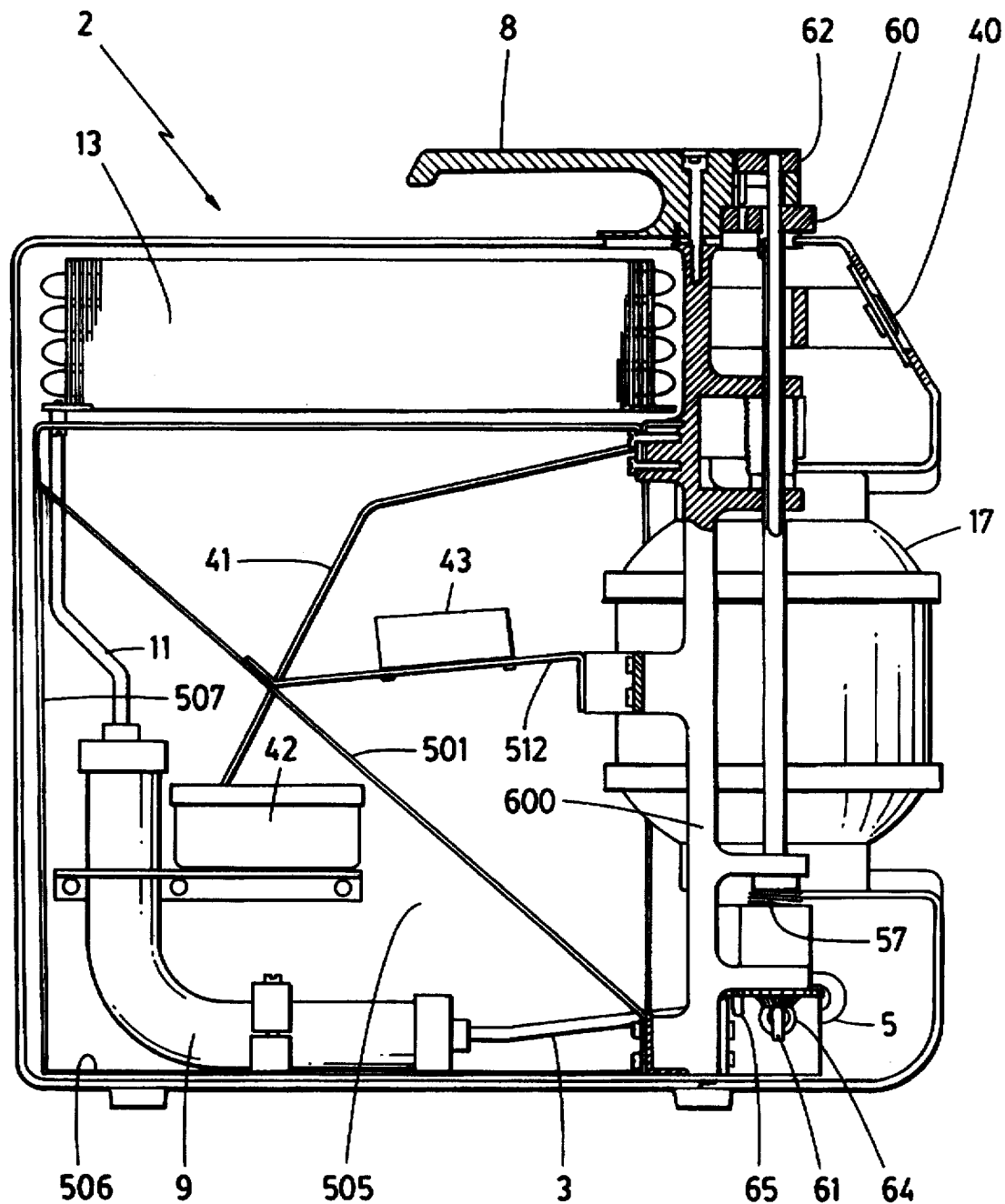
FIG. 8 is a sectional side view of a portable embodiment of this invention.
Figure 9:
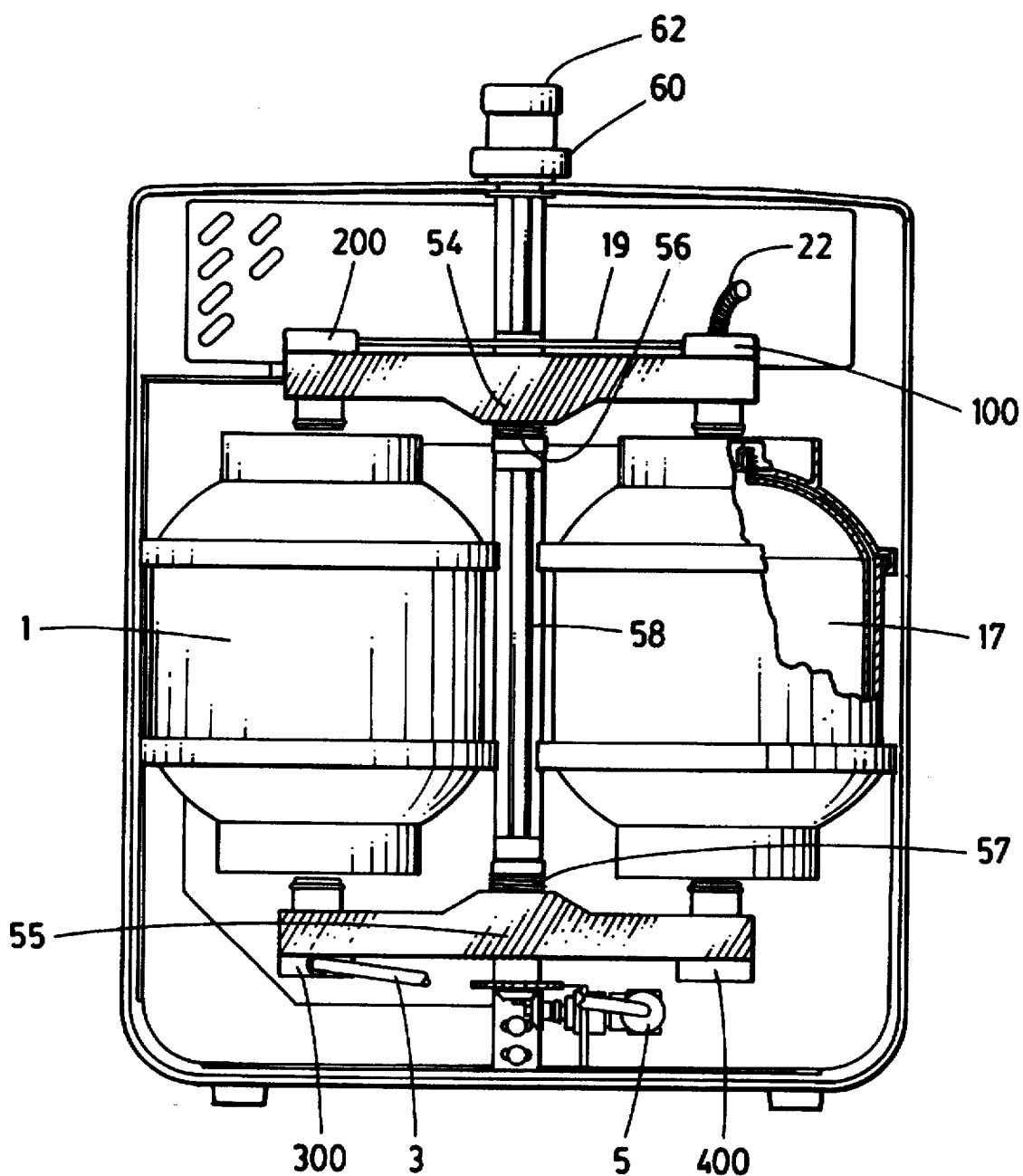
FIG. 9 is a sectional end view of said portable embodiment.

Referring to FIGS. 8 and 9, the preferred embodiment of a portable oxygen generating unit of this invention is contained in a portable housing (2) with a handle (8) for carrying the unit. A feed tank (1) is provided to store and supply aqueous hydrogen peroxide at high concentrations through a feed pipe (3) under control of valve (5) to a reactor (9) where it breaks down in the presence of a lead catalyst, to steam and oxygen which proceeds to a cooling coil (13) for condensation and into a separator tank (17), which stores the separated oxygen and water. A oxygen supply hose (22) permits the oxygen to be drawn off through a port (40) in the housing (2). Conventional valves, pressure gauges, flowmeters and regulators may be used as desired along oxygen supply hose (22) but are not material to this invention and are not shown. A return pipe (19) is provided between the tanks (1) and (17) to equalize pressure in the system after the process commences. In one preferred embodiment, a drain pipe (41) runs out of the return pipe (19) into a excess water box (42) to allow drops of condensing water to leave the return pipe (19) after shut down. A conventional valve (not shown) may be manually or automatically operated to open the drain pipe (41) upon shut down of the system. In one preferred embodiment a blower (43) is provided to circulate air within the housing (2).

Figure 10:
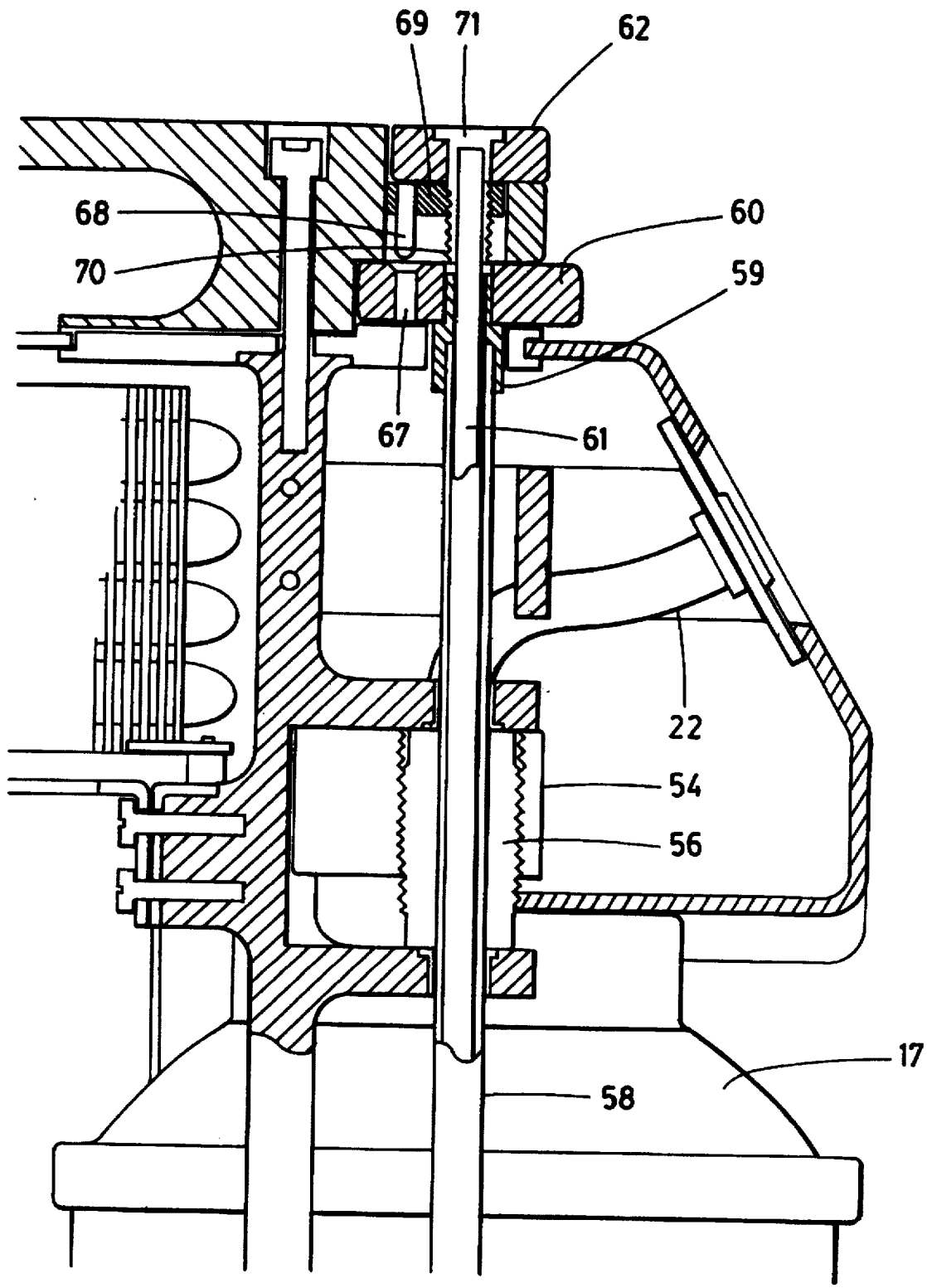
FIG. 10 is an enlarged sectional side view of the top portion of a control mechanism.

The peroxide feed tank (1) and the separator tank (17) are mounted removably within the housing (2) by means of plugs (100), (200), (300) and (400). The plugs (100) and (300) are mounted in yoke (54) and the plugs (200) and (400) are mounted in yoke (55). The yokes (54) and (55) may be moved towards or away from one another by means of threaded spindles (56) and (57), which turn within the yokes (54) and (55) respectively in a threaded connection. The threaded connection between spindle (56) and yoke (54) is opposite in direction to the threaded connection between yoke (55) and spindle (57). Both spindles (56) and (57) are connected by a shaft (58) which, as illustrated in FIG. 10, is connected by a collar (59) to a plug control knob (60). The opposite threading of the spindles (56) and (57) causes the yokes (54) and (55) to move in opposite directions as shaft (68) is rotated by knob (60).

Figure 11:
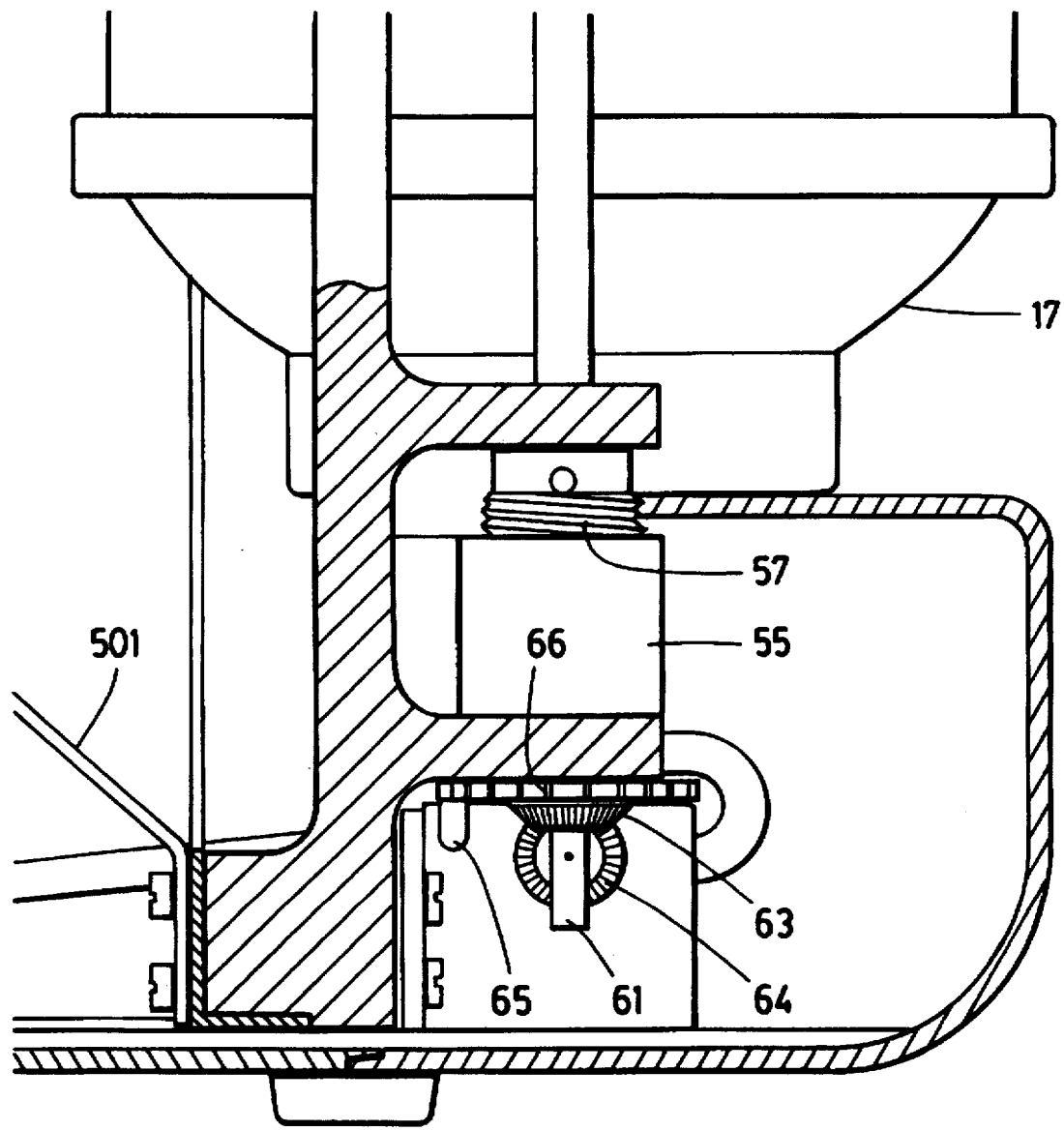
FIG. 11 is an enlarged sectional side view of the lower portion of a control mechanism.

Within the shaft (58) is a second shaft (61) which extends downwardly from a valve control knob (62), shown in FIG. 10, to drive gears (63) and (64) [see FIG. 11]. Gear (64) operates a feed valve (5) between open and closed positions to control flow of aqueous hydrogen peroxide from the feed tank (1) through feed pipe (3) to reactor (9) [see FIGS. 8 and 9].

Thus plug control knob (60) controls the yokes (54) and (55) to permit the plugs (100–400) to be disconnected from tanks (1) and (17) for replacement to replenish the system and to insert the plugs (100–400) into the new tanks (1) and (17) to secure them into the unit. Additional securement as desired may also be used, but that is not material to this invention. Once the plugs (100–400) are inserted, the valve control knob (62) may be turned to open the feed line (3) to permit aqueous hydrogen peroxide to flow from the feed tank (1) into the reactor (9).

Safety features are built into the controls. One is illustrated in FIG. 11. The yoke (55) has a depending pin (65) that projects into the sprockets of a sprocket wheel (66) attached to shaft (61) and gear (63) thereby preventing rotation of the valve control gear (64). Thus, the valve (5) cannot be opened until yoke (55) is drawn upwards together with pin (65) to free sprocket wheel (66) for rotation. Since yokes (54) and (55) move together, it is impossible to open valve (5) until all the plugs (100–400) are firmly inserted into the tanks (1) and (17).

Another safety feature is illustrated in FIG. 10. The plug control knob (60) has a hole (67) to receive a pin (68). The hole (67) is aligned with the pin (68) when the plug control knob (60) is fully turned to close the plugs (100–400) into the tanks (1) and (17) and when the valve control knob is in a position where valve (5) is fully closed. As the valve control knob (62) is turned downwards, the pin (68) and threaded section (69) are moved downwards along a threaded portion (70) of an inner sleeve (71) of the valve control knob (62). Thus, as the valve control knob (62) is turned to open the valve, the pin (68) is inserted into the hole (67) to make it impossible to turn the plug control knob (60). Therefore, the plugs (100–400) cannot be removed from the tanks (1) and (17) while the valve (5) is in an open position.

Figure 12:
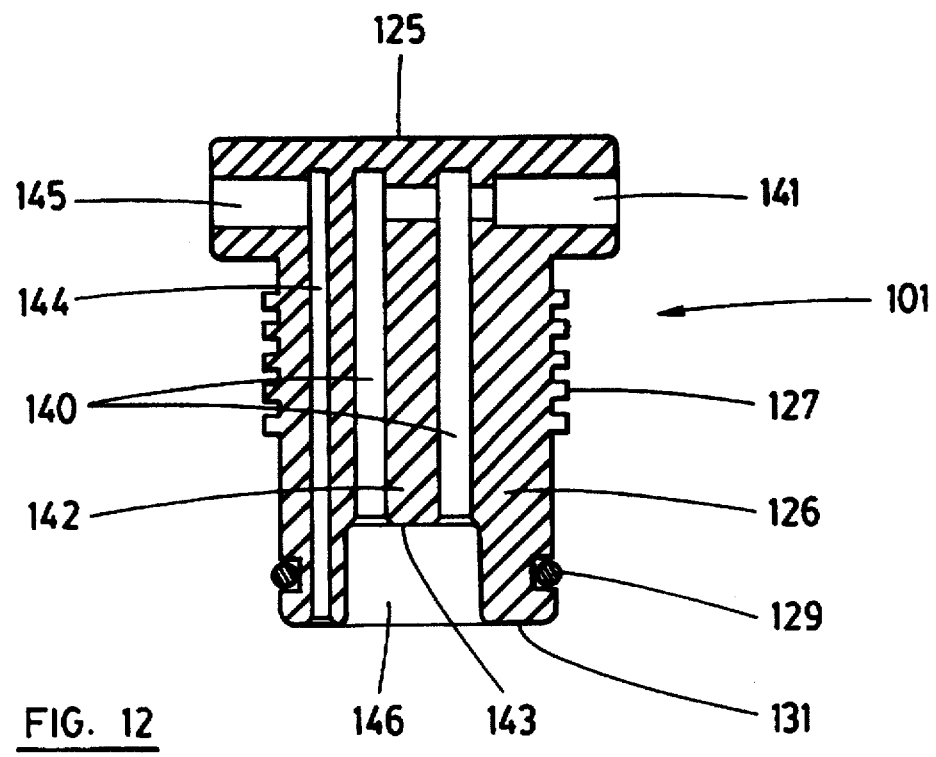
FIG. 12 is a cross section of a plug for the top of the separator tank.

FIGS. 12–19 illustrate the manner in which the plugs (100–400) fit into the tanks (1) and (17). FIG. 12 illustrates plug (100) which fits into the top of the separator tank (17). It has a head (125), a shaft (126) having a threaded portion (127) and a sealing O-ring (129) near a shaft end (131). In some embodiments a double O-ring may be used to achieve a better seal. Plug (100) has a pair of intake tubes (140) which meet in an intake port (141) to receive the oxygen and water from the cooling coil (13), a central column (142) with a lower column end (143) and a return/exhaust tube (144) extending up from one end (131) to a return/exhaust port (145). The return/exhaust port (145) is adapted to connect to an exhaust tube (22) to supply oxygen to a user [see FIGS. 9 and 10] and a return pipe (19) to establish communication between feed tank (1) and separator tank (17).

Figure 13:
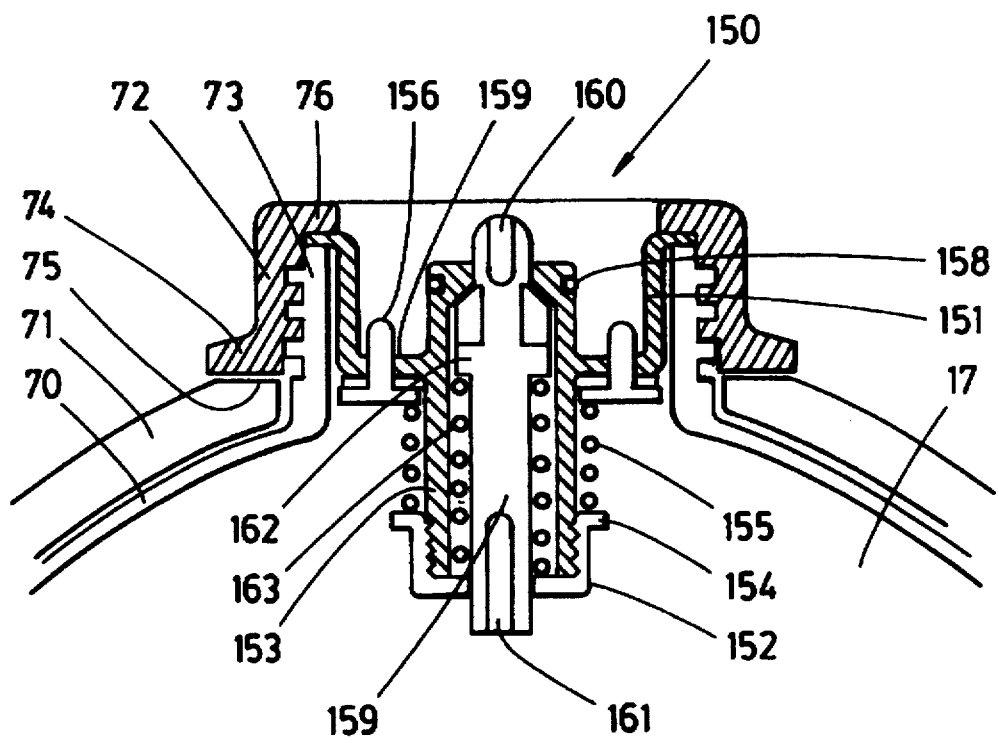
FIG. 13 is a cross section of a valve for the top of the separator tank.

FIG. 13 shows a valve (150) to receive plug (100). Valve (150) includes a cup (151) having a hollow shaft (153) and a threaded cap (152) having a shoulder (154) to support a spring (155) to bias a ring valve (156) upwardly into an opening (157) in the cup (151) to seal the separator tank (17). As plug (100) is inserted into the cup (151) the plug shaft ends (131) press the ring valve (156) downwardly to establish communication between the inside of the separator tank (17) and the return tube (144). Shaft (153) also extends upwardly through the cup (151) and has an O-ring (158) to seal against the interior surface of an opening (146) in the bottom of plug (100). Within shaft (153) is a valve stem (159) having upper grooves (160) and lower grooves (161) and shoulders (162). A spring (163) extends between the cap (152) and the shoulders (162) of valve stem (159) to bias the valve stem (159) upwardly. As the plug (100) descends into the cup (151) the lower end (143) of column (142) presses against the valve stem (159) to drive it downwards to permit circulation from the interior of the tank (17) through the grooves (161) about the valve stem (159) and out through the grooves (160) to permit intake of oxygen and water through intake tubes (140).

FIG. 13 and FIG. 9 also illustrate the construction of the tanks (1) and (17) and how each of the valves in the top and bottom of the tanks (1) and (17) are secured. Each of tanks (1) and (17) has a flexible inner tank (70) to contain the material within the tank and a rigid outer shell (71) to provide structure to maintain the shape of the tank. The inner shell (70) is connected to the outer shell (71) by means of a collar (72) which makes a threaded connection with a rigid upwardly extending and threaded portion (73) of the inner shell (70). The collar (72) has a shoulder (74) which seats on a sealing surface (75) of the outer shell (71). By connecting a collar to the top and bottom of the tanks (1) and (17) each of the inner shells (70) may be secured within the structural shells (71). The collar (52) fits over the valve cup [in this case (151), but similarly so in each of the others] to secure the valve within the tank.

Figure 14:
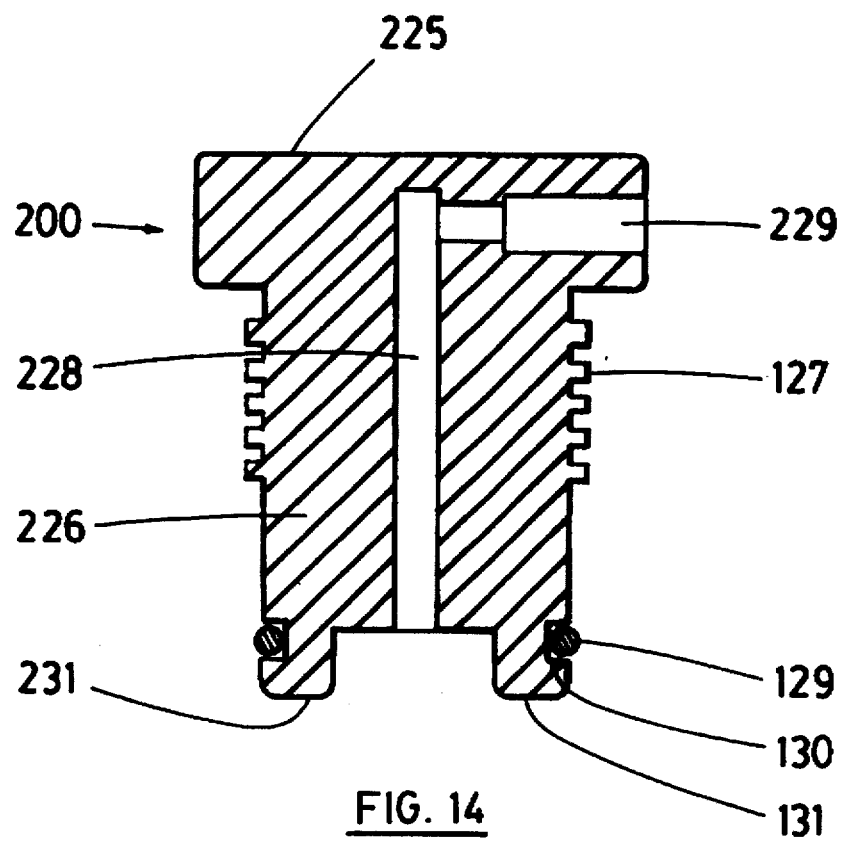
FIG. 14 is a cross section of a plug for the top of the feed tank.
Figure 15:
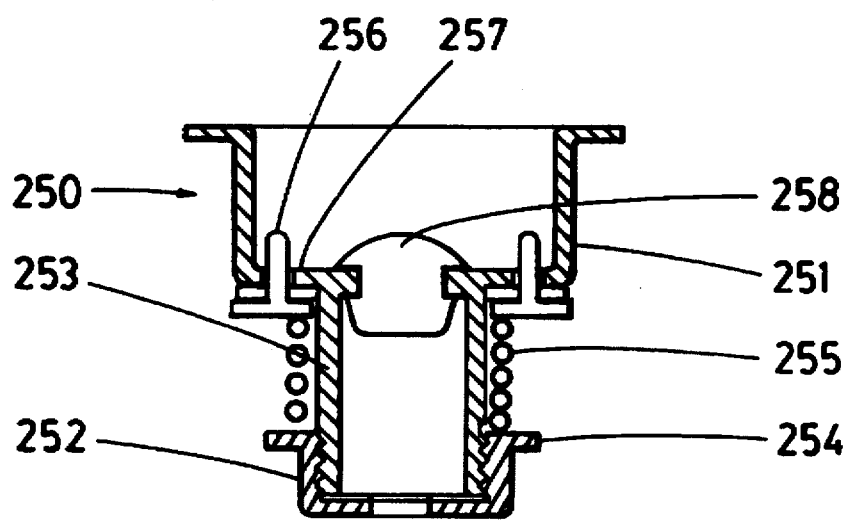
FIG. 15 is a cross section of a valve for the top of the feed tank.

FIG. 14 shows plug (200) with a head (225) and a shaft (226) with threads (227) to permit the shaft (226) to be screwed into a threaded opening in yoke (54) to seat the head (225) against the top of the yoke (54) with the lower portion of the shaft (226) depending below the bottom of yoke (54) for insertion into the top of tank (1). A return tube (228) extends up from the central portion of the bottom of shaft (226) and out the side of the head (225) to a return port (229) to receive an end of the return pipe (19) [as illustrated in FIG. 9]. One or more conventional relief valves (not shown) may be fired into return pipe (19) or into plugs (100) and (200) to relieve excess pressure during operation.

Plug (200) interacts with the valve (250) which is inserted within the top of feed tank (1). Valve (200) has a cup (251)

to receive the shaft (226) and O-ring (229) set in a groove (230) in a sealed connection. A cap (252) is threaded onto shaft (253) extending downwardly from the cup (251). Cap (252) has a shoulder (254) extending laterally outward to support a spring (255) which biases a ring valve (256) upwardly through an opening (257) in the cup (251). As the plug (200) descends into the valve (250) the protruding shaft end (231) presses against the ring valve (256) to permit communication between the interior of the feed tank (1) and the tubular opening (228) in plug (200). The cup (251) is also fitted with a safety release valve (258) which, in a conventional manner, prevents the build-up of unsafe pressures in the feed tank (1), e.g. where it contains peroxide but is not connected to the plug (200).

Figure 17:
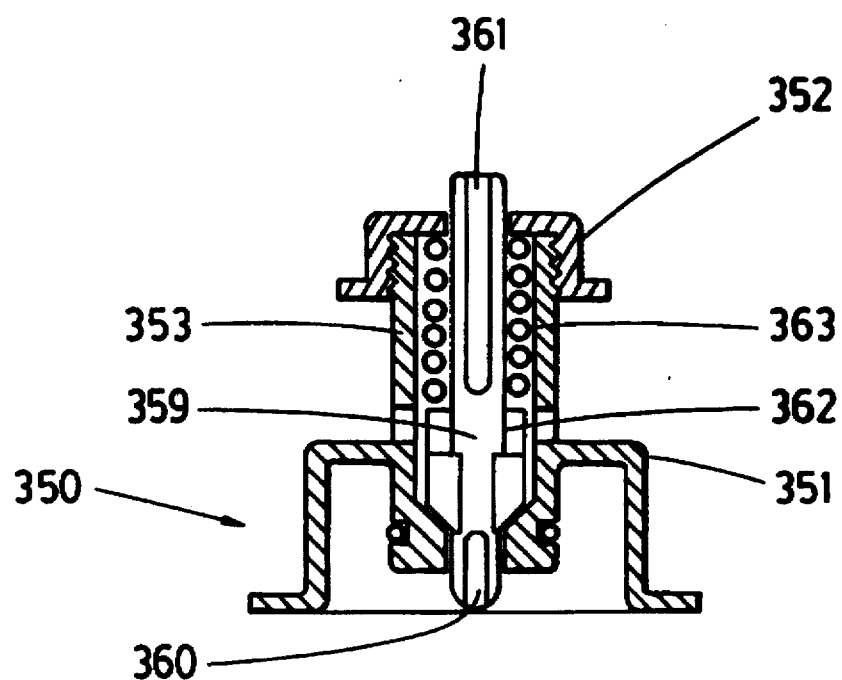
FIG. 17 is a cross section of a valve for the bottom of the feed tank.
Figure 16:
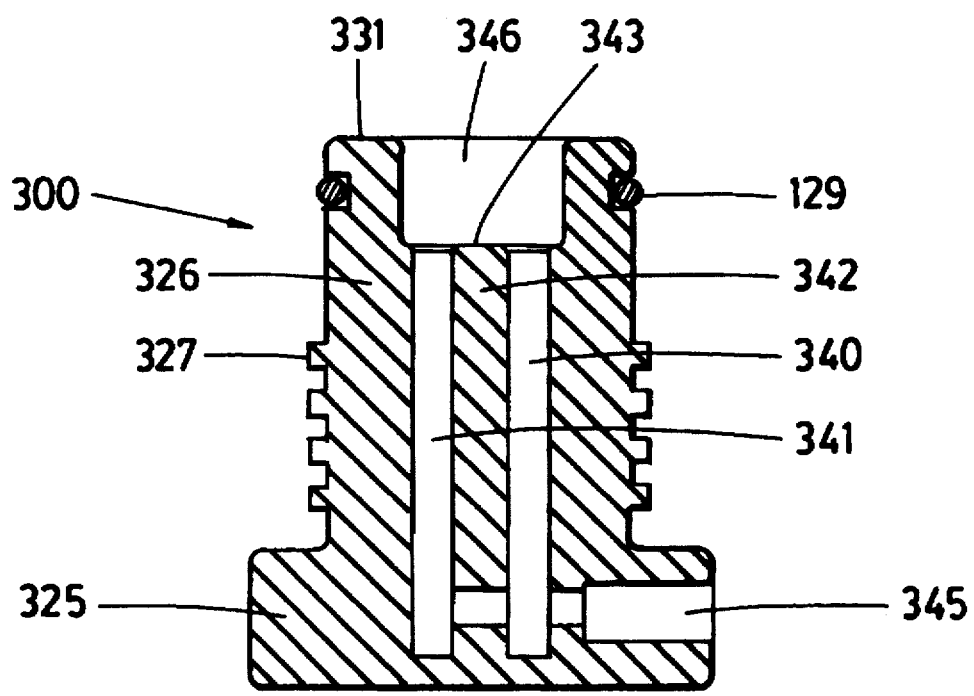
FIG. 16 is a cross section of a plug at the bottom of the feed tank.

FIGS. 16 and 17 illustrate plug (300) which fits into the bottom of the feed tank (1) and the valve (350) which receives it. It can be seen that plug (300) has a very similar construction to that of plug (100), shown in FIG. 12, except that it does not have a return tube (144). Plug (300) has a head (325); a shaft (326) with a threaded portion (327), an O-ring (329) and an end (331); peroxide supply tubes (340) and (341) meeting at port (345) adapted to receive a pipe (3); and a column (342) having an end (343).

FIG. 17 shows a valve (350) similarly constructed to that shown in FIG. 13, except that it does not have axing valve like ring valve (156). Valve (350) has a cup (351), a cap (352), a shaft (353) extending downwardly and upwardly through the cup (351). An O-ring (358) seals the shaft (353) within the internal surface of opening (346) in plug (300). Within and protruding from shaft (353) is a valve stem (359) with lower grooves (360) and upper grooves (361) to establish communication between the feed tank (1) and supply tubes (340) and (341) in plug (300) when the end (343) of column (342) depresses the valve stem (359) to permit flow from the feed tank (1) through the grooves (360) and (361).

Figure 19:
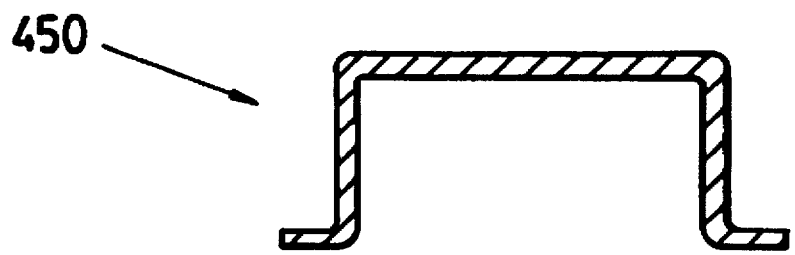
FIG. 19 is a cross section of a cap at the bottom of the separator tank.
Figure 18:
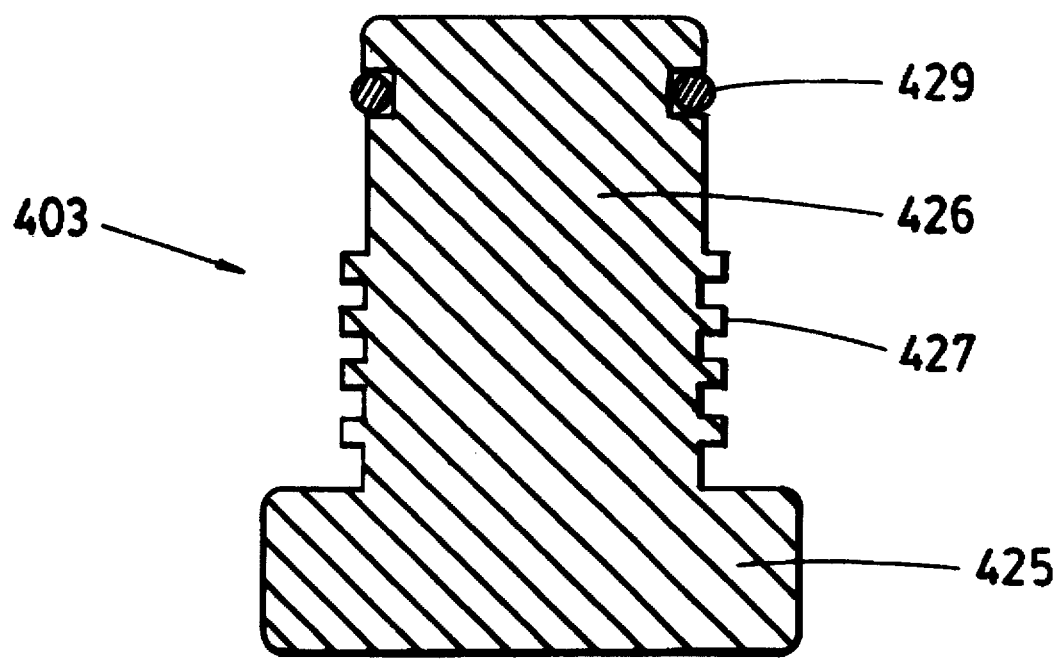
FIG. 18 is a cross section of a plug for the bottom of the separator tank.

FIGS. 18 and 19 illustrate a plug (400) and a dummy cap (450) which fit into the lower end of the separator tank (17). The lower end of tank (17) is not used to supply or remove material during operation so the plug (400) and the cap (450) serve a limited function to seal the end of the tank (17) and to balance and stabilize yoke (55). Plug (400) has a head (425), a shaft (426) having a threaded portion (427) to screw into yoke (55) and an O-ring (429) to create a frictional resistance to balance yoke (55) as the plugs (300) and (400) are inserted or removed.

Figure 20:
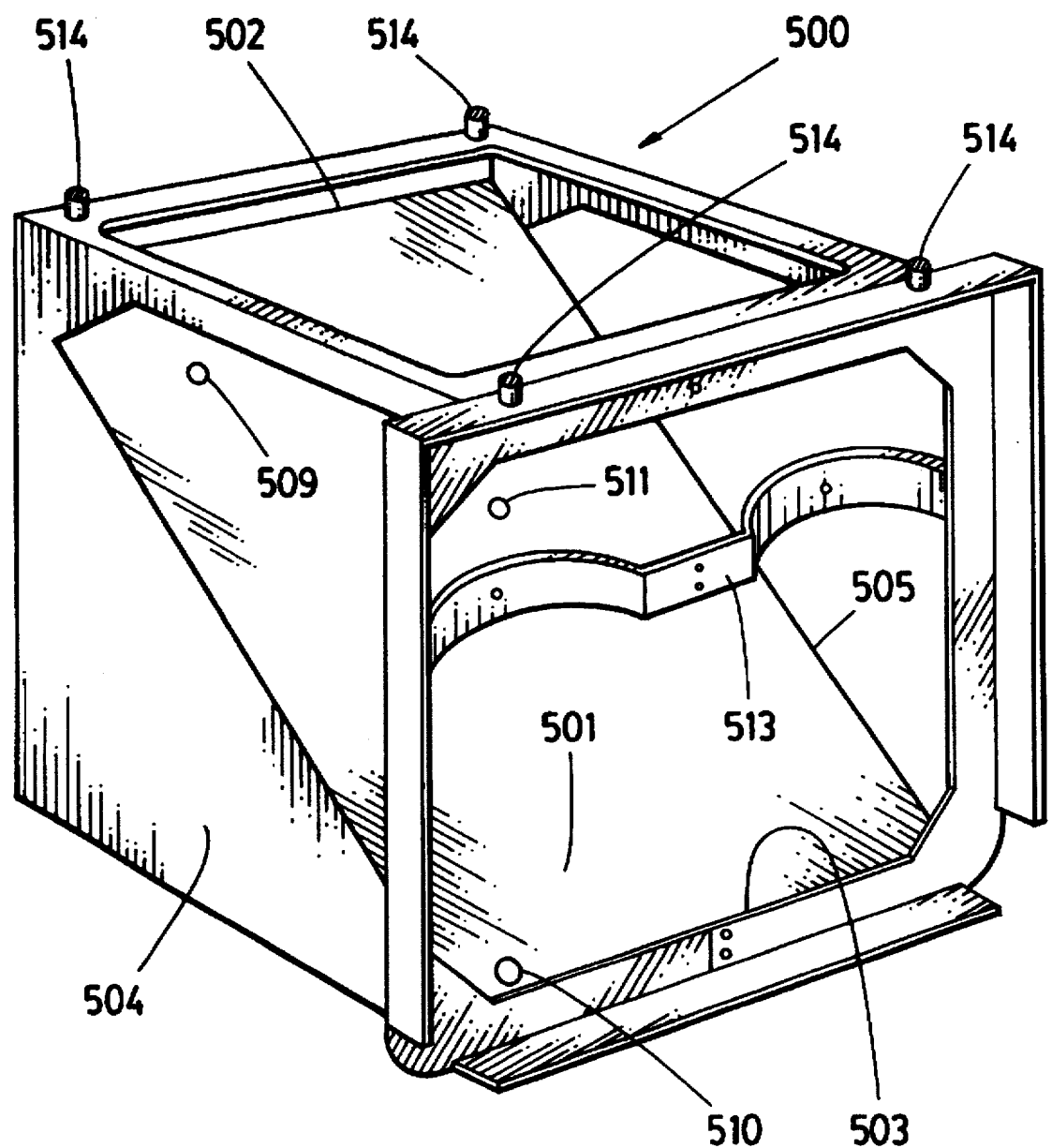
FIG. 20 is a perspective of an interior case.

FIGS. 20 and 8 illustrate the construction of interior case (500) that is attached within housing (2) to shield a user from exposure to the reactor (9). The case (500) has a box structure with a diagonal shield plate (501 running from the rear upper edge (502) to a front lower edge (503). The space under the shield plate (501) is enclosed by half-walls (504) and (505), a bottom wall (506) and a rear wall (507). Apertures (509), (510) and (511) are provided for pipes (11), (3) and (41) respectively to penetrate the shield (501). The reactor (9) and the excess water reservoir (42) may be mounted within the enclosed space under the shield (501) while the blower (43) may be mounted on a flange (512) extending from the shield (501) to a tank strap (513). The cooling coils (13) may be mounted onto female fastener receptacles (514). The tank and handle support structure (600) may be bolted or otherwise attached to the front of the case (500) [see FIGS. 8 and 11] to complete the housing (2).

This invention is useful in medical, scientific and industrial applications where a portable source of oxygen is required.

It will be appreciated by those skilled in the art that the description of the preferred embodiment is intended to be illustrative, rather than limiting of the construction and operation of this invention. Modifications and adaptations of this invention including the selection of materials and the layout of components may be determined by such skilled persons.

What is claimed is:

1. A portable oxygen generator comprising:
   a. a feed tank for aqueous hydrogen peroxide having a bottom opening with a supply valve to supply aqueous hydrogen peroxide and having a top opening with a return valve to receive equalizing pressure;
   b. supply pipe means to receive and conduct aqueous hydrogen peroxide from the feed tank including a regulator, and on\off valve and piping;
   c. A reactor to receive hydrogen peroxide from the supply pipe means and to decompose the hydrogen peroxide to oxygen and water in the presence of a catalyst, in which the reactor is a pipe having a round cross section and the catalyst comprises lead strips, each lead strip having a rectangular cross section and a length approximately equal to the length of the reactor, wherein said lead strips are laid longitudinally within the reactor and packed in juxtaposition across the cross section of the reactor to leave gaps between the lead strips for the flow of hydrogen peroxide and water and oxygen through the reactor;
   d. a cooling coil to receive oxygen and water from the reactor, to condense the water and to cool the oxygen;
   e. a separator tank for oxygen and water having a top opening with an intake valve to receive oxygen and water from the cooling coil, a return/exhaust valve to supply balancing pressure to the feed tank and to exhaust oxygen for a user and a bottom opening with a cap;
   f. a product line means to communicate with the separator tank to supply oxygen for use by an operator of the system; and
   g. a return line to communicate between the feed tank and the separator tank to balance their pressure;
   h. wherein the feed tank and the separator tank are removably held within the generator by a support structure having a plurality of plugs mounted to move into or out of the top and bottom openings in the feed tank and separator tank, said plugs including:
      i. a top feed tank plug to seal against top feed tank opening, to activate the return valve within said opening and having a tube to communicate with said return valve and the return line;
      ii. a bottom feed tank plug to seal against the bottom feed tank opening, to activate the supply valve within said opening and having a supply tube to communicate from the supply valve to the supply pipe means;
      iii. a top separator tank plug to seal against the top separator tank opening, to activate the intake and the return/exhaust valves within said opening and having an intake tube to communicate from the cooling coil to the intake valve and a return/exhaust tube to communicate from the return/exhaust valve to the return pipe and the product pipe; and
      iv. a bottom separator tank plug to fit within the cap in the bottom separator tank opening;
   i. plug control means to control the movement of the plugs; and j. on/off valve control means to control the state of the on/off valve in the supply pipe means.

2. The oxygen generator of claim 1 in which the reactor is capped at each end by screens to retain the lead strips and removable caps to permit replacement of the lead strips during non-operation and to seal the ends of the reactor during operation.

3. A portable oxygen generator as in claim 1 further comprising an on/off valve control stop that prevents an operator from opening the on/off valve when the plugs are removed from the tanks.

4. A portable oxygen generator as in claim 1 further comprising an on/off valve control stop that prevents an operator from removing the plugs are removed from the tanks when the on/off valve is on.

5. A portable oxygen generator as in claim 1 further comprising an on/off valve control stop that prevents an operator from opening the on/off valve when the plugs are removed from the tanks and by a plug control stop that prevents an operator from removing the plugs from the tanks when the on/off valve is on.

6. The oxygen generator of claim 5 in which:
   a. the on/off valve control means includes
      i. a twist control mounted on a valve control shaft to drive gears that control the on/off valve;
   b. the on/off valve control stop includes
      i. a first pin that is inserted into a sprocket wheel mounted on the control shaft to prevent it from turning when the plugs are removed from the openings in the tanks;
   c. the plug control means includes
      i. a twist control mounted on a plug control shaft to turn oppositely threaded upper and lower spindles;
      ii. an upper yoke and a lower yoke mounted on the upper and lower spindles to move in opposition to one another as the plug control shaft is turned and having the top feed tank plug and the top separator tank plug mounted in the upper yoke and having the bottom feed tank plug and the bottom separator tank plug mounted in the lower yoke to fit into the respective tank openings;
   d. the plug control stop means includes
      i. a second pin protruding from a section mounted on a threaded portion of the on/off valve control shaft to raise or lower the second pin as the on/off control shaft is turned;
      ii. a hole in the plug twist control to receive the second pin when the plug twist control valve is turned to insert the plugs in the openings of the tanks and the on/off valve control is being turned on thereby preventing rotation of the plug twist control to remove the plugs as long as the on/off valve is in the on position.

7. A portable oxygen generator comprising:
   a. an aqueous hydrogen peroxide feed tank having a supply valve opening and a return valve to receive equalizing pressure, wherein the return valve is elevated with respect to the supply valve;
   b. supply pipe coupled to the feed tank and adapted to conduct aqueous hydrogen peroxide from the feed tank to a reactor;
   c. said reactor adapted to receive hydrogen peroxide from the supply pipe, and to decompose the hydrogen peroxide to oxygen and water in the presence of a catalyst, wherein the reactor has a length;
   d. the catalyst comprises lead strips having strip lengths approximately equal to the length of the reactor and have a cross-sectional width substantially shorter than the strip length, wherein said lead strips are laid longitudinally within the reactor and packed in juxtaposition across a cross section of the reactor to leave gaps between the lead strips for the flow of hydrogen peroxide and water and oxygen through the reactor;
   d. a cooling coil adapted to receive oxygen and water from the reactor, to condense the water and to cool the oxygen;
   e. a separator tank adapted to receive the oxygen and the water and having a return/exhaust valve adapted to supply the equalizing pressure to the feed tank and to exhaust oxygen for a user; and
   g. a return line to communicate between the feed tank and the separator tank to convey the equalizing pressure from the separator tank to the feed tank.

* * * * *